July 11, 1944.  J. W. KING  2,353,405
MATERIAL HANDLING APPARATUS
Filed May 25, 1943  3 Sheets-Sheet 1
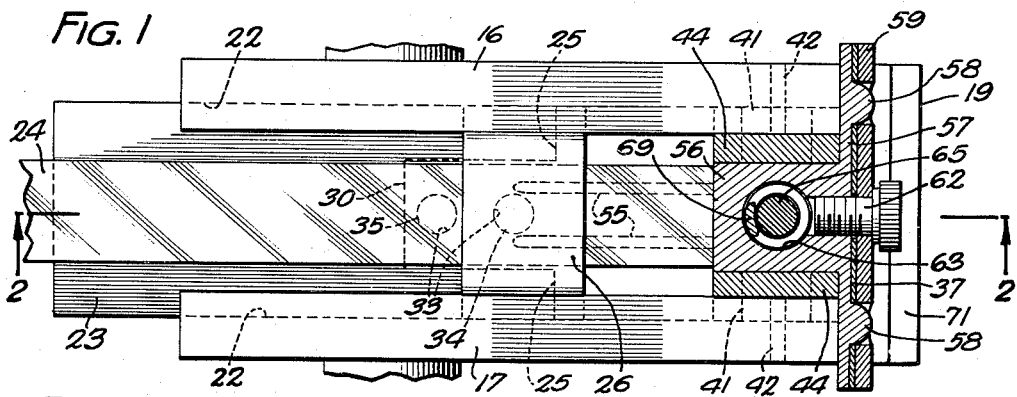
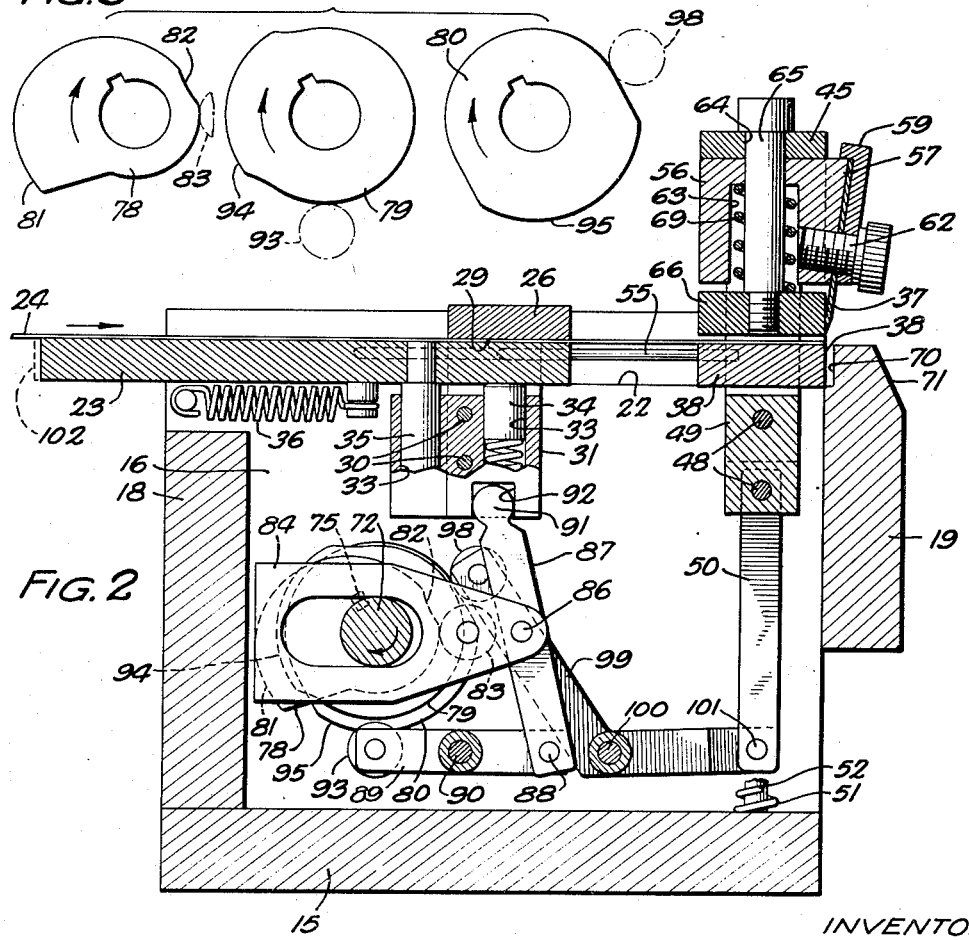
INVENTOR
J. W. KING
BY Harry L. Duft
ATTORNEY July 11, 1944.  J. W. KING  2,353,405
MATERIAL HANDLING APPARATUS
Filed May 25, 1943    3 Sheets-Sheet 2

INVENTOR
J. W. KING
BY Harry L. Duft
ATTORNEY

July 11, 1944.  J. W. KING  2,353,405
MATERIAL HANDLING APPARATUS
Filed May 25, 1943  3 Sheets-Sheet 3
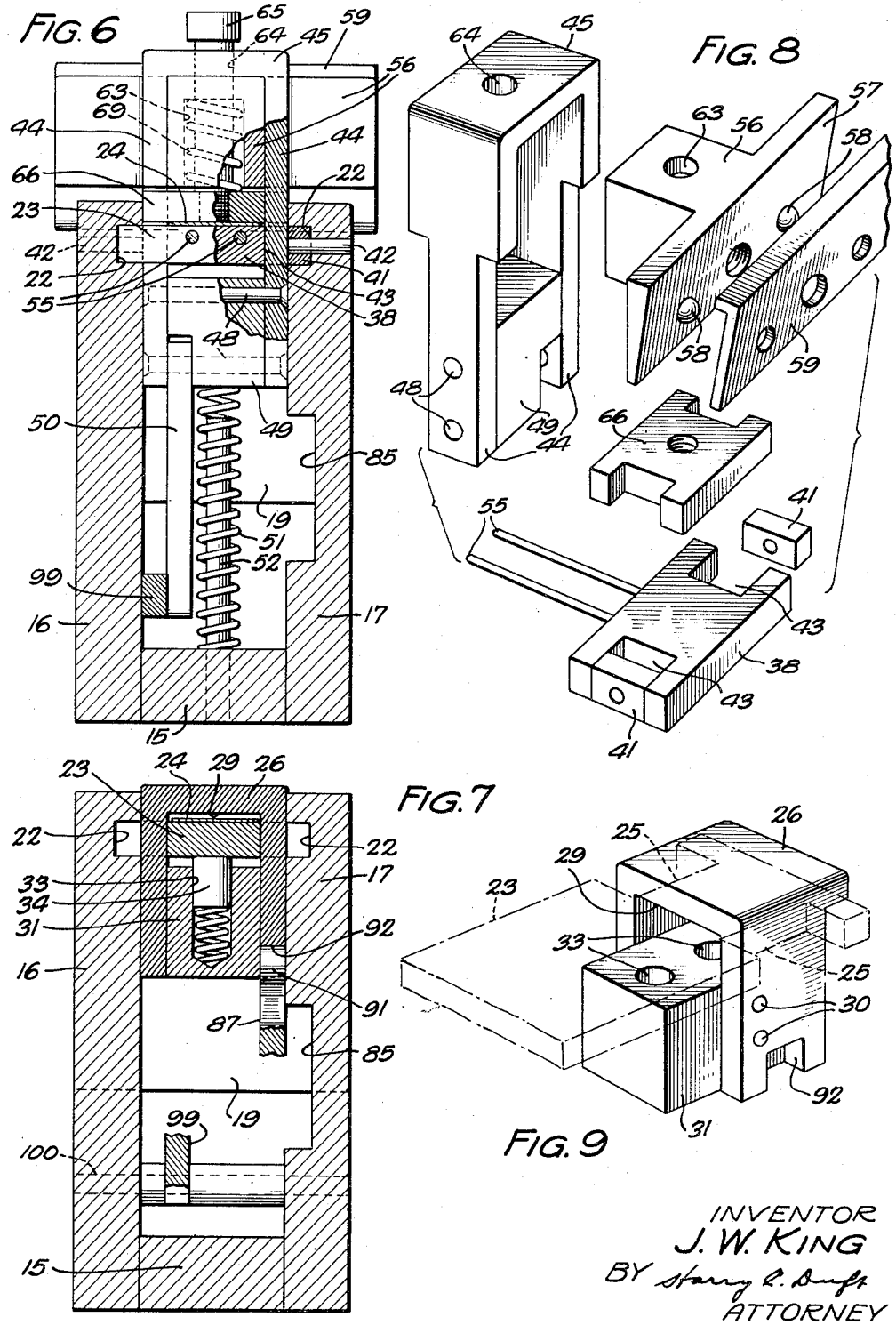
INVENTOR
J. W. KING
BY Harry C. Duff
ATTORNEY Patented July 11, 1944

2,353,405

UNITED STATES PATENT OFFICE 2,353,405

MATERIAL HANDLING APPARATUS

John W. King, Oak Park, Ill., assignor to Western Electric Company, Incorporated, New York, N. Y., a corporation of New York Application May 25, 1943, Serial No. 488,381

12 Claims. (Cl. 164—48)

This invention relates to material handling apparatus and more particularly to apparatus for feeding and cutting material.

The invention is particularly applicable to feeding and severing predetermined lengths of thin lead foil from a continuous supply for use in the manufacture of electrical devices, such as, for example, condensers. For such use, it is necessary that the foil lengths should be free of bends or crinkles and this has been difficult to accomplish under high speed production due to the thinness of the foil.

An object of this invention is the provision of a practicable and efficient apparatus for rapidly and accurately feeding and severing predetermined lengths of material from a continuous supply without marring or damaging the same.

In accordance with one embodiment of the invention as used for intermittently feeding and severing predetermined lengths of thin lead foil from a continuous supply, there is provided a high speed motor driven apparatus comprising cooperating stationary and reciprocatory shearing blades and an associated clamping shoe for gripping the foil in advance of and during the severing operation, and a reciprocatory clamping and feeding device for gripping the foil and advancing its leading end past the reciprocatory blade and its clamping shoe while the latter are in retracted positions, the feeding device including a reciprocatory clamping shoe movable perpendicularly to its reciprocatory movement. The reciprocatory shearing blade and its shoe and the feeding device and its shoe are operated in co-ordinated timed relation during each operating cycle by a motor driven shaft carrying a plurality of cams, the cams effecting the desired operations through lever and link mechanism and cooperating springs. The arrangement is such that after the foil is advanced by the feeding device, its shoe is released from the foil and remains released while the feeding device is being retracted and during the final portion of such movement, its shoe is operated to grip the foil to the device which serves to draw the foil slightly backward before the next advance movement thereof, which occurs immediately, to insure that its leading edge will be completely free from the stationary shearing blade, thus permitting the foil to be freely advanced without bending or crinkling.

Other objects and advantages of the invention will more fully appear from the following detailed description taken in conjunction with the accompanying drawings, in which Fig. 1 is a fragmentary plan view, partly in section, of a material feeding and severing apparatus embodying the features of the invention;

Fig. 2 is an irregular vertical section taken on the line 2—2 of Fig. 1, the elements of the apparatus being shown substantially in their fully retracted positions and just preceding the feeding and severing operations;

Fig. 3 illustrates in detail the operating cams, the cams being shown removed from their driving shaft and in the relative positions they occupy in Fig. 2;

Fig. 6 is an irregular vertical section taken on the line 6—6 of Fig. 4;

Fig. 7 is an irregular vertical section taken on the line 7—7 of Fig. 4; and

Figs. 8 and 9 are disassembled perspective views of certain parts shown in Figs. 6 and 7, respectively.

Figure 4:
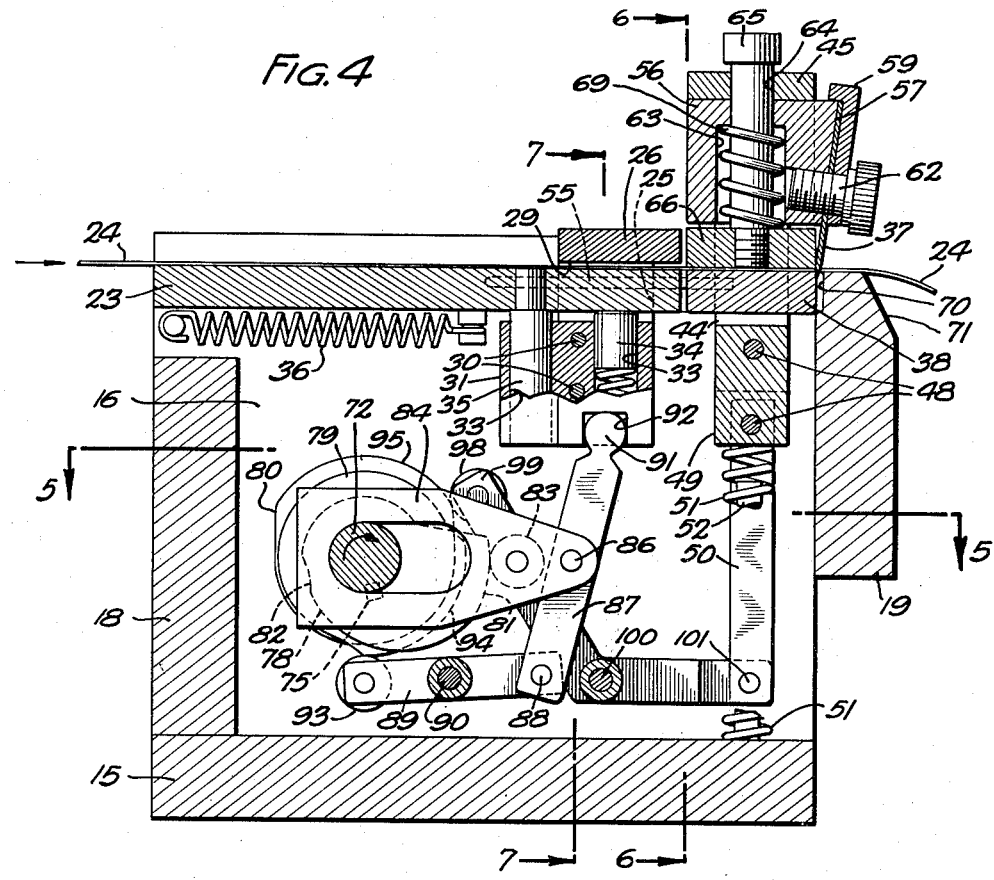
Fig. 4 is a view similar to Fig. 2 with the elements shown in their advanced positions just after completing feeding and severing operations.

Referring now to the drawings, particularly to Figs. 2 and 6, a supporting frame for the operating parts of the apparatus comprises a bottom plate 15, side walls 16 and 17 and end walls 18 and 19 suitably secured together. The opposed inner faces of the side walls 16 and 17 at their upper ends (Figs. 1 and 6) are formed with aligned slideways 22 in which is mounted for horizontal reciprocatory movement a foil feeding plate 23, upon which is continuously supported and to which is intermittently gripped the forward end of a very thin lead foil strip 24 which is led in the direction of the arrow (Fig. 2) from a coiled supply (not shown). The right end of the plate 23 is formed with aligned slideways 25 (Figs. 1 and 9) in which is mounted for vertical reciprocatory movement, a U-shaped shoe 26 which in its lowered position (Fig. 2) serves to grip the foil strip 24 between an inner face 29 thereof and the upper face of the plate 23. In Figs. 4 and 7, the shoe 26 is shown in its raised position to release the foil strip 24. Secured to the bifurcations of the U-shaped shoe 26 below the plate 23 by pins 30 is a block 31 having two vertical apertures 33 in one of which is carried a spring pressed plunger 34 constantly bearing against the bottom face of the plate 23, the normal action of the spring and plunger being to draw the shoe 26 downwardly to grip the foil strip 24 to the plate 23. In the other aperture 33 is freely fitted a guide pin 35 fixed to the plate 23 for guiding the shoe 26 in its movements. A coiled tension spring 36, fixed at opposite ends to the plate 23 and to the frame, tends normally to draw the plate 23 to the left, as shown in Fig. 2.

Thus, it will be apparent when the shoe 26 is permitted to move downwardly and grip the foil strip 24 to the feeding plate 23, as shown in Fig. 2, and thereafter the plate is moved by means to be described hereinafter, to the right, that the strip will be advanced therewith. The position of the plate 23 and strip 24 after their advance is shown in Fig. 4. Thereafter the shoe 26 is elevated to release the foil strip from the shoe and plate 23, as shown in Fig. 4, through the action of the plate reciprocating means and, thereafter, the plate is retracted for the following strip feeding movement.

After the foil strip 24 is fed forward to the position shown in Fig. 4, a length shown extending outwardly from the inner vertical face of the end wall 19 is severed from the strip by a vertical reciprocatory shear blade 37 and a cooperating stationary shear blade 38 (Fig. 2). The blade 38 is mounted in the plane of the feeding plate 23 and is fitted at opposite ends in the plate slideways 22, thus firmly fixing it against up and down movement. As shown in detail in Fig. 8, the blade 38 is forked at opposite ends and between the inner opposed faces of the forks are fitted rectangular shaped blocks 41, which are pinned at 42 to the side walls 16 and 17 (Fig. 6), thus, firmly fixing the blade against horizontal movement. With the blocks 41 in position in the forked ends of the blade 38, openings 43 are formed to provide slideways for arms 44 of a U-shaped vertical reciprocatory member 45 which carries the movable shear blade 37. Between the lower ends of the arms 44 and below the blade 38 is fixed, by rivets 48, a notched block 49 in which, and on one of the rivets 48, is pivoted an actuating link 50 which, in a manner to be described hereinafter, moves the shear blade 37 downwardly to the position shown in Fig. 4. A coiled compressing spring 51, engaging at opposite ends the upper and lower faces of the bottom frame plate 15 and the block 49, respectively, and supported on a pin 52 fixed to the plate 15, is effective to constantly urge the shear blade upwardly to the position shown in Fig. 2. Fixed to the stationary shear blade 38 and extending horizontally from its inner vertical face are a pair of rods 55 having their left ends slidably fitted in apertures in the feeding plate 23. The rods 55 are arranged immediately below the foil strip 24 and serve as a support therefor when the feeding plate 23 is in its retracted position (Fig. 2), in case the foil strip should slacken and drop down to engage the same.

Fitted between the upper ends of the arms 44 of the U-shaped member 45 is a T-shaped member 56, having an inclined right hand face 57 (Figs. 4 and 8) from which extend two semi-circular spaced locating lugs 58 (Figs. 1 and 8) for the shear blade 37, which is apertured to receive the lugs. The blade 37 is clamped to the member 45 by an L-shaped plate 59 formed with apertures for receiving the lugs 58, and an aperture for receiving a retaining screw 62 threaded into the member 56. Formed in the member 56 is a shouldered vertical aperture 63 in alignment with an aperture 64 in the upper horizontal web of the U-shaped member 45, and extending through the apertures is a shouldered screw 65 which is threadedly secured at its lower end to a shoe 66, which serves to grip the foil strip 24 to the upper face of the stationary shear blade 38 in advance of the shearing stroke of the blade 37 in the operation of the apparatus. In Figs. 2 and 4, the shoe 66 is shown in released and clamping positions, respectively, relative to the foil strip 24. The shoe 66 is forked at opposite ends to receive the arms 44 of the member 45 for guiding it thereon in its reciprocatory movements. Surrounding the screw 65 within the larger diameter of the shouldered aperture 63 of the member 56 is a coiled compression spring 69 bearing at opposite ends against the member 56 and the shoe 66, which acts to constantly urge the shoe 66 downwardly on the member 45 toward the foil strip 24 to maintain its lower face below the lower shearing edge of the movable blade 37, as shown in Fig. 2. With this arrangement, it will be apparent that when the member 45 is drawn downwardly by its actuating link 50, the yieldably mounted shoe 66 will engage the foil strip 24 in advance of the shear blade 37, also moving downwardly, thus gripping the strip to the stationary blade 38 before the blade 37, continuing its downward travel, engages the strip. The upper face of the end wall 19 lies in the plane of the stationary shear blade 38 and the foil strip 24 is advanced thereover in the feeding operation. A notch 70 is provided in the inner vertical face of the end wall 19 to provide clearance for the shear blade 37, as shown in Fig. 4, and the outer vertical face of the end wall is inclined at 71 in order to reduce the thickness of the wall, thus permitting the severed portion of the foil strip 24 to readily drop from the apparatus into a receptacle (not shown).

Figure 5:
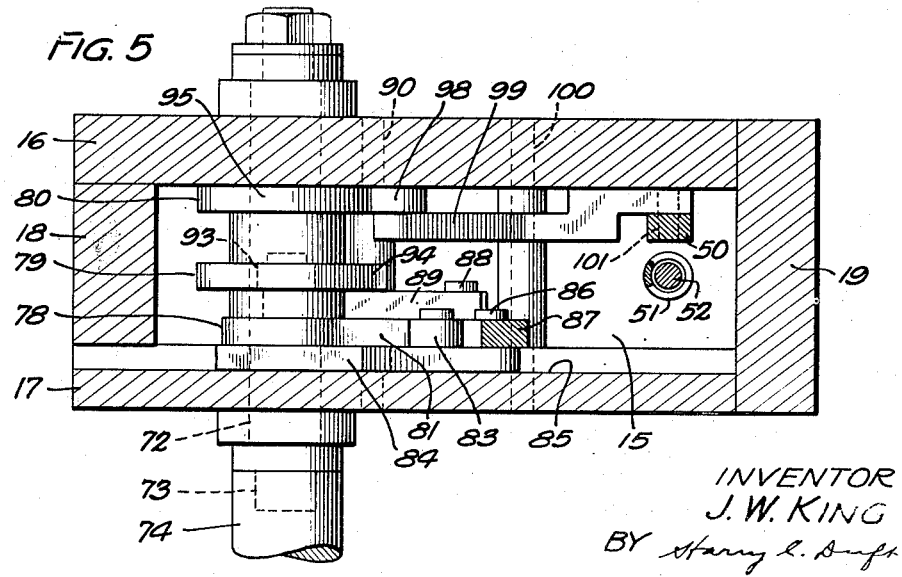
Fig. 5 is an irregular plan section taken on the line 5—5 of Fig. 4.

The above mentioned foil strip feeding and severing operations are effected in timed relation and during each revolution of a shaft 72 journalled in the side walls 16 and 17, which is directly connected at 73 (Fig. 5) to a high speed shaft shown fragmentarily at 74 of an electric motor (not shown), in the following manner. Keyed at 75 to the shaft 72 for rotation therewith are three cam disks 78, 79 and 80. The cam disk 78 is formed with a peripheral cam lobe 81 and a cam recess 82. In the path of the lobe 81 and recess 82 is a cam follower 83 carried on a slotted plate 84 surrounding, slidable and rockable on the shaft 72, and freely movable in a slot 85 formed in the inner face of the side wall 17. At its right end (Fig. 4) the plate 84 is pivotally connected at 86 to a lever 87, which, in turn, is pivotally connected, at its lower end, at 88 to one end of a lever 89 pivoted on a stud shaft 90 fixed at opposite ends to the side walls 16 and 17. The upper end of the lever 87 has a circular-like formation 91 fitted to rock or turn in a notch 92 in the lower end of one of the arms of the U-shaped reciprocatory shoe 26 (Figs. 2 and 7), which serves to grip the foil strip 24 to the feeding plate 23 when moved downwardly. The opposite end of the lever 89 carries a cam follower 93, which lies in the path of a peripheral cam lobe 94 on the cam disc 79. Lying in the path of a peripheral cam lobe 95 of the cam disc 80 is a cam follower 98 carried on one end of a bell crank lever 99 pivoted on a stud shaft 100 fixed at opposite ends to the side walls 16 and 17. The bell crank lever 99, at its opposite end, is pivotally connected at 101 to the actuating link 50 for the member 45, which carries the shear blade 37.

In the operation of the above-described apparatus and beginning the cycle of operation with the various elements positioned as shown in Figs. 1, 2 and 3, the operation is as follows:

It will be assumed that the cam disks 78, 79 and 80 have all been peripherally formed as well as adjusted relative to each other upon the shaft 72 to time correctly through the operatively associated and described lever and link mechanism, the periodic movements to be effected thereby.

As shown, the foil strip feeding plate 23 and the shoe 26, which moves horizontally therewith, in addition to its periodic vertical movement to grip and release the foil strip 24 relative to the plate 23, are in substantially their fully retracted or left hand positions and the shoe 26 has just moved downwardly to grip the foil strip to the plate, as shown. A slight rotation of the shaft 72 and the cam disks 78, 79 and 80 fixed thereto, from their positions shown in Figs. 2 and 3, will cause the cam follower 83 to ride into the recess 82 of the cam disk 78, which permits the spring 36 to quickly act again to draw the feeding plate with the foil strip gripped thereto slightly to the left, a distance indicated by the vertical broken line 102 adjacent the left end face of the plate 23. The purpose of this slight backward movement of the foil strip 24 is to insure that its leading edge located at the point where it was last severed is completely free of the shearing edge of the stationary shear blade 38, otherwise, during the following feeding movement, the foil strip will fold over, bulge, or crinkle due to its thinness and, thus, will invariably result in waste of material and a slowing down of production.

In the continued rotation of the shaft 72, the cam follower 83 rides onto the cam lobe 81 of the cam disk 78, thereby quickly advancing the slotted plate 84 to the right and rocking clockwise about its pivot 88 on the lever 89, the lever 87 thus advancing the feeding plate 23, with the foil strip 24 gripped thereto in the manner previously described, to the right, and projecting a predetermined length of the strip beyond the point of shearing to the position shown in Fig. 4, the shear blade 37 at this time being in its retracted position, as shown in Fig. 2, by the action of the spring 51, since the cam follower 98 is idly riding upon a concentric face of the disk 80 lying opposite the lobe 95. During this advance of the feeding plate 23, the cam follower 93 is idly riding upon a concentric face of the cam disk 79 and the shoe 26 is being held in its lowered foil gripping position by the action of the spring-pressed plunger 34. The instant the foil strip 24 completes its advance, the cam follower 93 rides onto the lobe 94 of the cam disk 79, which serves to rock counterclockwise the lever 89 about its pivot 90, thus raising the connected lever 87 and, with it, the foil gripping shoe 26 to release the foil strip from the feeding plate 23 (Fig. 4). During movement of the lever 87 either upwardly or downwardly, it will be understood that the connected plate 84 will rock idly on the shaft 72. Simultaneously with the raising of the shoe 26, in the manner described, the cam follower 98 rides onto the lobe 95 of the cam disk 80, which results in a clockwise movement of the bell crank lever 99 about its pivot 100 and, thus, the connected link 50 is drawn downwardly and with it the member 45 carrying the yieldably supported foil strip gripping shoe 66 and the shear blade 37, which effects first a gripping of the foil strip to the plate 23 by the shoe 66 and then a shearing of the strip by the blade 37.

Immediately upon completion of the shearing operation, the cam follower 83 rides off the cam lobe 81 of the cam disk 78 and onto the concentric face of the cam disk and then the spring 36 acts to retract the feeding plate 23 to the position shown in Fig. 2. After retraction of the feeding plate 23 to the position shown in Fig. 2, the cam follower 98 rides off the cam lobe 95 of the cam disk 80, and the shoe 66 and shear blade 37 return to their retracted or upper position (Fig. 2). Upon the plate 23 reaching this latter position and in timed relation with the retraction of the shoe 66 and shear blade 37, the cam follower 93 immediately rides off the cam lobe 94 of the cam disk 79 and the shoe 26, under the action of the spring pressed plunger 34, is moved downwardly to grip the foil strip 24 to the plate 23, which position is also shown in Fig. 2, and the cycle of operations is completed, the shaft 72 having made one complete revolution at the rate of approximately 350 R. P. M.

It will be understood that the embodiment herein described is merely illustrative of the invention and one application thereof and that modifications can be made and it is capable of other applications.

What is claimed is:

1. An apparatus for intermittently feeding material comprising a reciprocable feed member upon which the material rests, a clamping member reciprocable therewith, and means for driving said clamping member and feed member including means for causing said clamping member to grip the material during the feeding stroke to predeterminedly locate the leading edge of the material, release the material during a substantial portion of the return stroke of the feed member and grip the material during the remaining portion of the return stroke whereby the material is drawn back a predetermined distance before the following feeding stroke occurs.

2. An apparatus for intermittently feeding strip material in steps and severing the material upon completion of each step comprising a reciprocatory material supporting and feeding means, a clamping member reciprocable therewith, material severing means including a movable shear blade, and means for driving said clamping member, feeding means and shear blade in timed relation during each operating cycle including means for causing said clamping member to grip the material during the feeding stroke to predeterminedly advance the leading edge of the material beyond the severing means, operate said shear blade to sever the material, release the material during a substantial portion of the return stroke of the feed member and grip the material during the remaining portion of the return stroke whereby the material is drawn back a predetermined distance from its point of severing before the following feeding stroke occurs.

3. In an apparatus for intermittently feeding strip material in steps, a reciprocatory material supporting and feeding means, means movable relative to and with said feeding means for clamping the material thereto, and means for automatically actuating said clamping and feeding means in timed relation during each operating cycle to clamp the material to and advance said feeding means and the material to predeterminedly locate the leading edge of the material, move the clamping means to release the material, and retract the feeding means for the succeeding cycle, the material being released by the clamping means during a portion of the retractive movement of the feeding means and gripped again during the remaining portion thereof whereby the material is drawn back a predetermined distance before the following feeding movement occurs.

4. In an apparatus for intermittently feeding strip material in steps, a reciprocatory material supporting and feeding means, a clamping shoe for clamping the material thereto, said clamping shoe being reciprocably carried on said feeding means for movement at an angle to the movement thereof for clamping the material thereto, and means for automatically actuating said clamping shoe and feeding means in timed relation during each operating cycle to clamp the material to and advance said feeding means and the material to predeterminedly locate the leading edge of the material, retract the clamping shoe to release the material, and retract the feeding means for the succeeding cycle, the material being released by the clamping shoe during a portion of the retractive movement of the feeding means and clamped again during the remaining portion thereof whereby the material is drawn back a predetermined distance before the following feeding movement occurs.

5. In an apparatus for intermittently feeding strip material predetermined distances and shearing successive leading end portions therefrom, a reciprocatory material supporting and feeding means, means movable relative to and with said feeding means for clamping the material thereto, cooperating stationary and movable shear blades for shearing the fed portion from the strip, and means for automatically actuating said clamping and feeding means and movable shear blade in timed relation during each operating cycle to clamp the material to and advance said feeding means and the material a predetermined distance, advance the movable shear blade to and from the material to shear the material, retract the clamping means to release the material, and retract the feeding means for the succeeding cycle, the material being released by the clamping means during a portion of the retractive movement of the feeding means and clamped again during the remaining portion thereof whereby the material is drawn back a predetermined distance from its point of shearing before the following feeding movement occurs.

6. An apparatus for intermittently feeding elongated material in steps and severing the material upon completion of each step comprising a reciprocatory spring retracted material supporting and feeding member, spring actuated means movable with said member for clamping the material thereto, a stationary shear blade, a spring retracted shear blade cooperating therewith for shearing the leading fed portion from the material, and means for operating said member and clamping means and spring retracted shear blade in timed relation during each operating cycle to feed and sever the material, retract said spring pressed shear blade, positively move the clamping means to release the material, retract the feeding member and clamping means, move the clamping means to again clamp the material to the member, and to retract the feeding member and clamping means to draw the severed edge of the material back from the stationary shearing edge of the succeeding cycle.

7. An apparatus for feeding strip material in steps and severing the material upon completion of each step comprising a reciprocatory material supporting and feeding member, means movable relative to and with said member for clamping the material thereto, a combined stationary shear and clamping block, a cooperating movable shear blade for shearing the leading fed portion from the strip, a yieldable clamping member cooperating with said stationary block, operable with said movable shear blade for clamping the material upon completion of each feeding step to said block before the material is sheared, and means for automatically actuating said clamping means and feeding member, movable shear blade and clamping member in timed relation during each operating cycle to clamp the material to and advance said feeding member and the material a step forward, advance the clamping member and movable shear blade to clamp and shear the material, retract the clamping means and the movable shear blade and clamping member to release the material, and retract the feeding member for the succeeding cycle, the material being released by the clamping means during a major portion of the retractive movement of the feeding member and clamped again during the remaining portion thereof whereby the material is drawn back a predetermined distance before the following feeding movement occurs, the retraction of the clamping member occurring after said major portion of the retractive movement of the feeding means, but before said latter movement of the material occurs.

8. An apparatus for intermittently feeding strip material in steps and severing the material upon a completion of each step comprising a spring retracted reciprocatory material supporting and feeding means, a spring advanced clamping member reciprocable therewith, material severing means including a spring retracted shear blade, and means for driving said clamping member, feeding means and shear blade in timed relation during each operating cycle, said driving means including a single continuously rotating shaft having a plurality of cam faces, a pivotal lever operatively engaging one of said cam faces, a plate carried by and movable radially of said shaft and operatively engaging another of said cam faces, a second lever pivoted to said plate and at one end to said first lever, the opposite end of said second lever being operatively connected to said clamping member to move the same to release the material and to advance the feeding means through the clamping member upon said plate being moved in one direction upon said shaft, and a third pivotal lever operatively engaging another of said cam faces and operatively connected to said shear blade to move the same to sever the material, said cam faces engaged by said first lever and said plate cooperating during the return stroke of the feeding means to cause the release of the material during a substantial portion of the return stroke of the feeding means and a gripping of the material during the remaining portion of the return stroke whereby the material is drawn back a predetermined distance before the following feeding stroke occurs.

9. An apparatus for intermittently feeding strip material in steps and severing the material upon completion of each step comprising a reciprocatory material supporting and feeding means, a clamping member movable relative to and reciprocable therewith, material severing means including a movable shear blade, and means for driving said clamping member, feeding means and shear blade in timed relation during each operating cycle, said driving means including a single continuously rotating shaft having a plurality of cam faces, a pivotal lever operatively engaging one of said cam faces, a plate carried by and movable radially of said shaft and operatively engaging another of said cam faces, a second lever pivoted to said plate and at one end of said first lever, the opposite end of said second lever being operatively connected to said clamping member to actuate the same to advance the feeding means through the clamping member upon said plate being moved in one direction upon said shaft, and a third pivotal lever operatively engaging another of said cam faces and operatively connected to said shear blade to actuate the same to sever the material, said cam faces engaged by said first lever and said plate cooperating during the return stroke of the feeding means to cause the release of the material during a substantial portion of the return stroke of the feeding means and a gripping of the material during the remaining portion of the return stroke whereby the material is drawn back a predetermined distance before the following feeding stroke occurs.

10. An apparatus for feeding and cutting material comprising a slideway, a reciprocatory clamping and feeding means on said slideway, an oscillatory lever for reciprocating said means, means for oscillating said lever, and means for imparting a longitudinal movement to said lever to cause it to actuate said clamping and feeding means to clamp and unclamp said material.

11. An apparatus for feeding and cutting material comprising a slideway, a reciprocatory clamping and feeding means on said slideway, an oscillatory lever for reciprocating said means, means for oscillating said lever, means for imparting a longitudinal movement to said lever to cause it to actuate said clamping and feeding means to clamp and unclamp said material, and a second clamping means operated in timed relation to said first clamping means and serving to clamp said material during the reverse movement of said first clamping and feeding means.

12. An apparatus for feeding and cutting material comprising a slideway, reciprocatory clamping and feeding means on said slideway, said means including a clamping member movable at right angles to its feeding movement, an oscillatory lever for reciprocating said means to feed the material, means for oscillating said lever, and means for imparting a longitudinal movement to said lever to cause it to actuate said clamping member to clamp and unclamp said material.

JOHN W. KING.